(12) United States Patent
Rado

(10) Patent No.: US 11,622,581 B2
(45) Date of Patent: Apr. 11, 2023

(54) CARTRIDGE COVER FOR PERSONAL VAPORIZER

(71) Applicant: Lubby Holdings, LLC, Torrance, CA (US)

(72) Inventor: J. Christian Rado, Torrance, CA (US)

(73) Assignee: Lubby Holding, LLC, Torrance, CA (US)

( * ) Notice: Subject to any disclaimer, the term of this patent is extended or adjusted under 35 U.S.C. 154(b) by 125 days.

(21) Appl. No.: 17/107,697

(22) Filed: Nov. 30, 2020

(65) Prior Publication Data

US 2021/0076738 A1    Mar. 18, 2021

Related U.S. Application Data

(63) Continuation of application No. 16/293,544, filed on Mar. 5, 2019, now Pat. No. 10,849,365, which is a continuation of application No. 14/927,355, filed on Oct. 29, 2015, now Pat. No. 10,219,541.

(60) Provisional application No. 62/072,351, filed on Oct. 29, 2014.

(51) Int. Cl.
*A24F 40/42* (2020.01)
*A24F 40/10* (2020.01)

(52) U.S. Cl.
CPC .............. *A24F 40/42* (2020.01); *A24F 40/10* (2020.01)

(58) Field of Classification Search
CPC .... A24F 47/004; A24F 47/002; A24F 47/008; A24F 11/00; A24F 25/02; A24F 40/42; A24F 40/10
See application file for complete search history.

(56) References Cited

U.S. PATENT DOCUMENTS

| | | |
|---|---|---|
| 2,104,266 A | 1/1938 | McCormick |
| 3,200,819 A | 8/1965 | Gilbert |
| 4,947,874 A | 8/1990 | Brooks |
| 7,832,410 B2 | 11/2010 | Hon |
| 8,156,944 B2 | 4/2012 | Han |
| 8,365,742 B2 | 2/2013 | Hon |
| 8,375,957 B2 | 2/2013 | Hon |
| 8,393,331 B2 | 3/2013 | Hon |
| 8,499,766 B1 | 8/2013 | Newton |
| 8,528,569 B1 | 9/2013 | Newton |
| 8,794,231 B2 | 8/2014 | Thorens |
| 8,899,238 B2 | 12/2014 | Robinson |
| 8,910,639 B2 | 12/2014 | Chang |
| 8,915,254 B2 | 12/2014 | Thorens |
| 8,997,753 B2 | 4/2015 | Li |
| 9,078,474 B2 | 7/2015 | Thompson |
| 9,220,303 B2 | 12/2015 | Li |

(Continued)

FOREIGN PATENT DOCUMENTS

WO    WO2014102095    7/2014

*Primary Examiner* — Thanh Tam T Le
(74) *Attorney, Agent, or Firm* — KOS IP Law LLP

(57) ABSTRACT

A cartridge is selectively usable with a personal vaporizer. The cartridge may include a chamber for holding a vaporizing medium such as a liquid solution. The cartridge may also include an atomizer that can be manufactured as a unit with the chamber. The cartridge can be attached to a vaporizer structure such as a battery assembly. A cartridge cover fits over and encloses the cartridge therewithin. The cartridge cover can employ decorative aspects that match or complement decorative aspects of the battery assembly.

14 Claims, 8 Drawing Sheets

(56) References Cited

U.S. PATENT DOCUMENTS

| | | |
|---|---|---|
| 9,254,007 B2 | 2/2016 | Liu |
| 9,277,770 B2 | 3/2016 | DePiano |
| 9,370,205 B2 | 6/2016 | Hon |
| 9,380,811 B2 | 7/2016 | Chung |
| 9,427,022 B2 | 8/2016 | Levin |
| 9,456,632 B2 | 10/2016 | Hon |
| 9,462,832 B2 | 10/2016 | Lord |
| 9,532,599 B2 | 1/2017 | Liu |
| 9,532,602 B2 | 1/2017 | Liu |
| 9,538,789 B2 | 1/2017 | Liu |
| 9,572,372 B2 | 2/2017 | Liu |
| 9,597,466 B2 | 3/2017 | Henry, Jr |
| 9,609,893 B2 | 4/2017 | Novak, III |
| 9,723,876 B2 | 8/2017 | Cadieux |
| 9,750,284 B2 | 9/2017 | Rado |
| 9,781,953 B2 | 10/2017 | Verleur |
| 9,924,741 B2 | 3/2018 | Collett |
| 9,980,514 B2 | 5/2018 | Malamud |
| 10,004,264 B2 | 6/2018 | Rado |
| 10,021,909 B2 | 7/2018 | Rado |
| 10,085,481 B2 | 10/2018 | Verleur |
| 10,219,541 B2 | 3/2019 | Rado |
| 10,849,365 B2 * | 12/2020 | Rado ............... A24F 40/42 |
| 2011/0094523 A1 | 4/2011 | Thorens |
| 2012/0318882 A1 | 12/2012 | Abehasera |
| 2013/0140197 A1 | 6/2013 | Fiebelkorn |
| 2013/0152922 A1 | 6/2013 | Benassayag |
| 2013/0192615 A1 | 8/2013 | Tucker |
| 2013/0192617 A1 | 8/2013 | Thompson |
| 2013/0247910 A1 | 9/2013 | Postma |
| 2013/0298905 A1 | 11/2013 | Levin |
| 2013/0306065 A1 | 11/2013 | Thorens |
| 2014/0041655 A1 | 2/2014 | Barron et al. |
| 2014/0123989 A1 | 5/2014 | LaMothe |
| 2015/0144148 A1 | 5/2015 | Chen |
| 2015/0164147 A1 | 6/2015 | Verleur |
| 2015/0208729 A1 | 7/2015 | Monsees |
| 2015/0208731 A1 | 7/2015 | Malamud |
| 2016/0095357 A1 | 4/2016 | Burton |

* cited by examiner

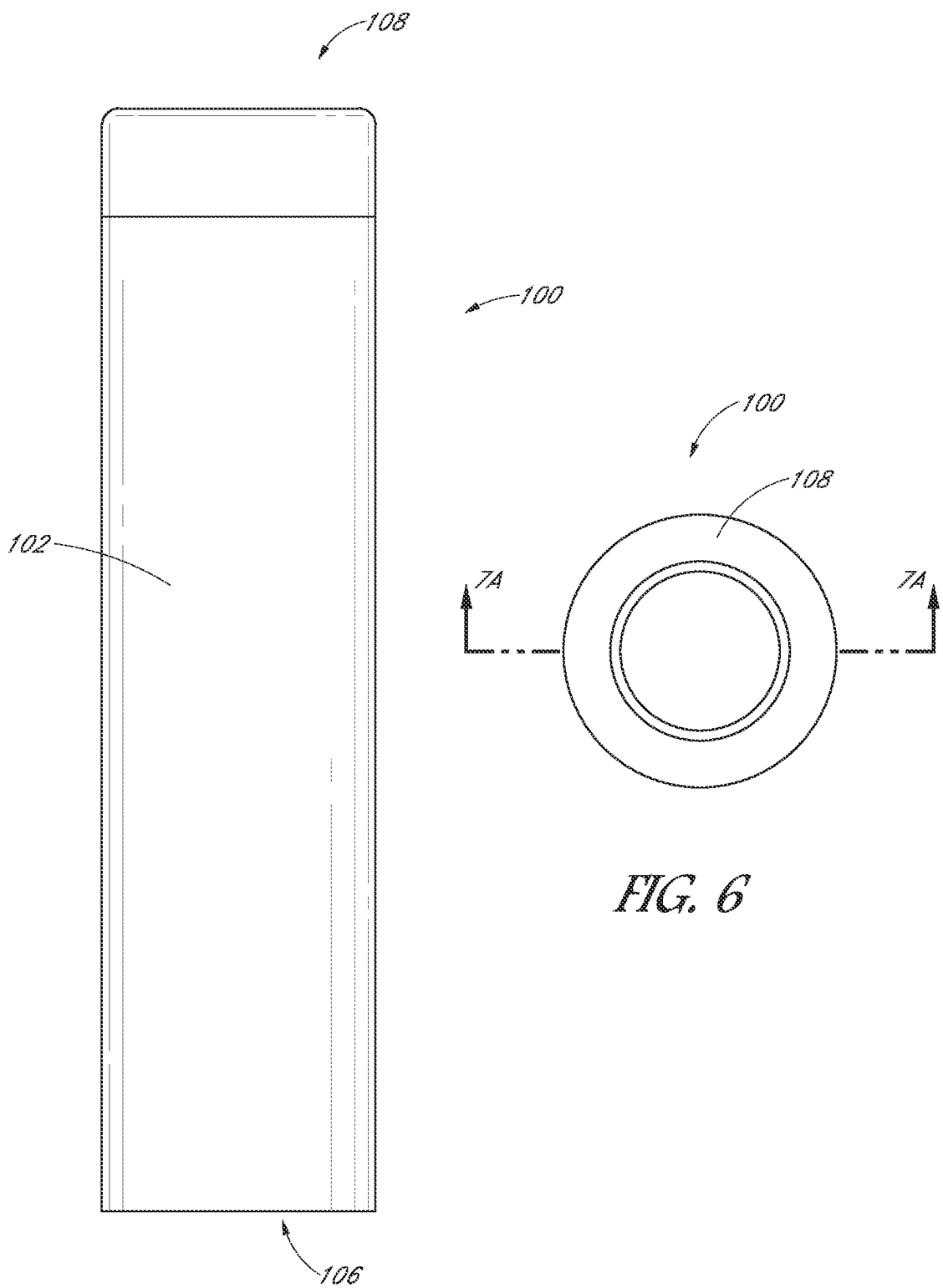

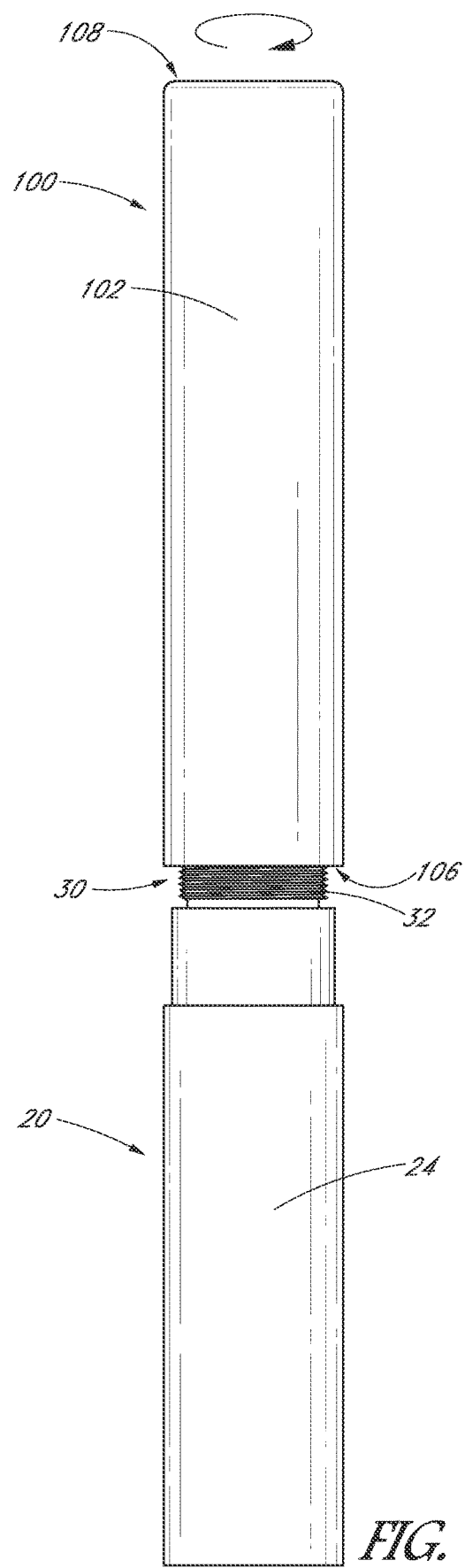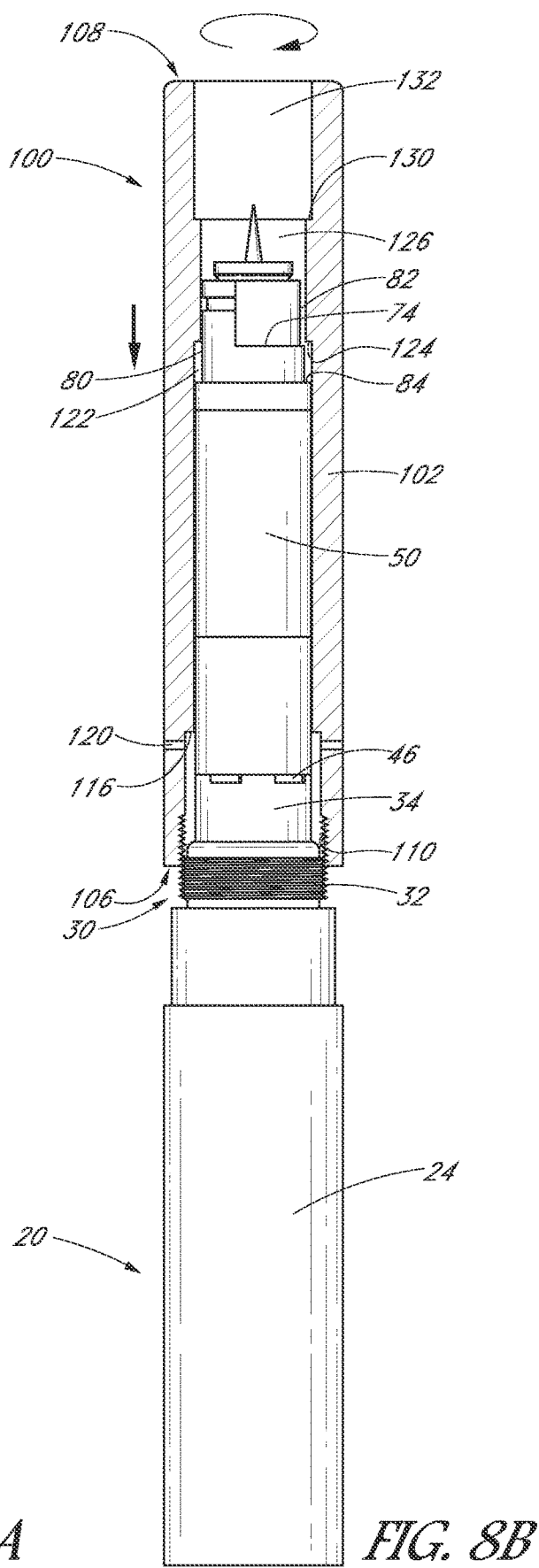
*FIG. 8A*  *FIG. 8B*

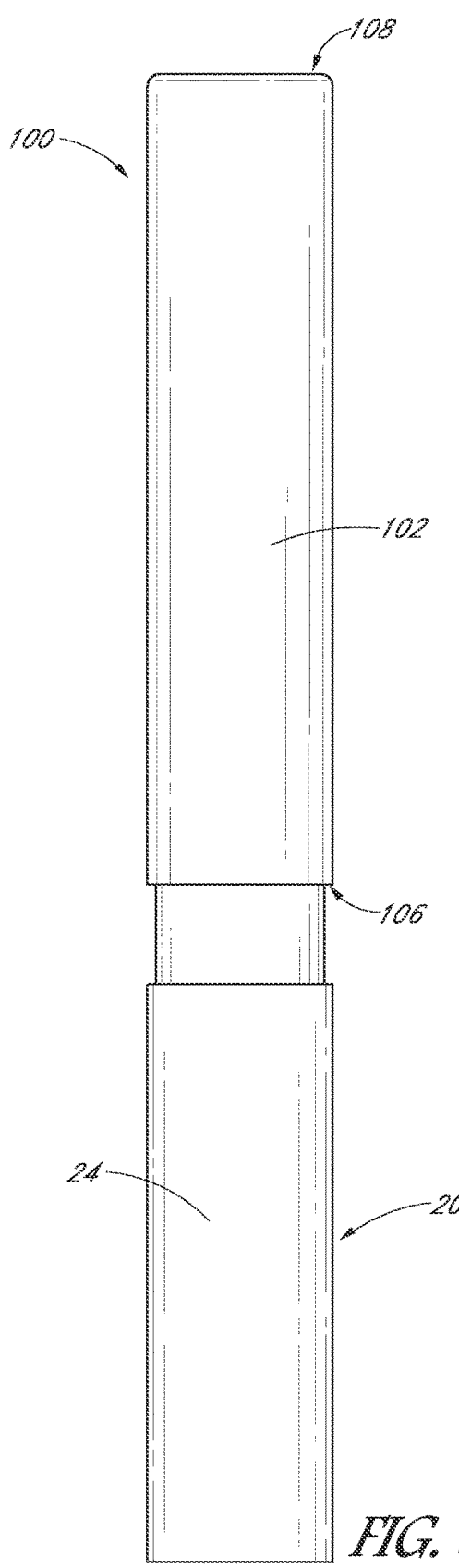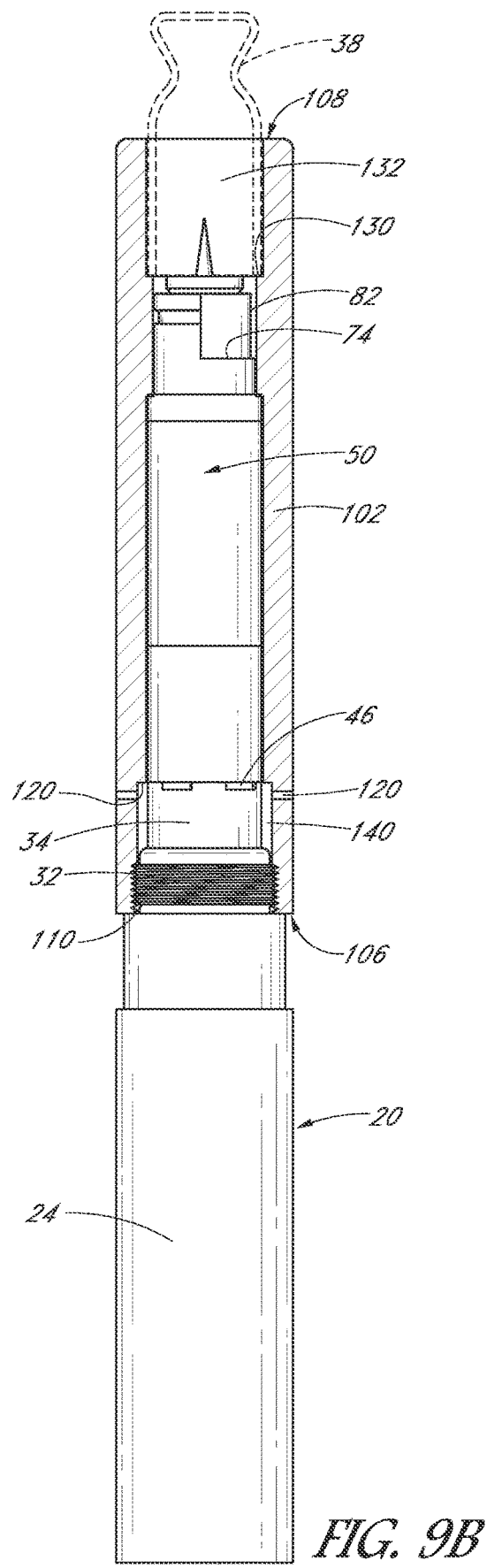
FIG. 8A
FIG. 9B

CARTRIDGE COVER FOR PERSONAL VAPORIZER

CROSS-REFERENCE TO RELATED APPLICATION

This application is a continuation of U.S. application Ser. No. 16/293,544, filed on Mar. 5, 2019, which is a continuation of U.S. application Ser. No. 14/927,355, filed on Oct. 29, 2015, now U.S. Pat. No. 10,219,541, which claims priority to U.S. Provisional Application No. 62/072,351, filed Oct. 29, 2014, the entireties of which are incorporated by reference.

BACKGROUND

The present disclosure relates to the field of personal vaporizers

Personal vaporizers are handheld devices that vaporize a vaporizing medium such as a liquid solution or a wax. The vapor is then inhaled by its user. A typical personal vaporizer has an atomizer having a heating element that selectively heats the medium in order to produce the vapor. A rechargeable battery is also typically employed for powering the atomizer. Personal vaporizers for vaporizing liquid media typically include a fluid chamber that holds the liquid, and a wick that communicates liquid from the chamber to the atomizer. The liquid solution typically includes chemicals such as one or more of propylene glycol, glycerin, polyethylene glycol 400, and an alcohol. Extracted flavorings can also be included in the fluid. Electronic cigarettes are a type of personal vaporizer, and use a liquid solution that includes tobacco-derived nicotine. Personal vaporizers also can be used with liquid solutions that include one or more of various essential oils, including cannabis oil.

Personal vaporizers are available having distinct styles and pleasing aesthetics. For example, battery assemblies and other parts of personal vaporizers can be emblazoned with high-quality patterns and materials.

Currently, disposable cartridges are available that include a liquid chamber and atomizer that are provided as a unit. The cartridge can be attached to a separately-purchased battery assembly for power. However, typically such disposable cartridges are unsightly and do not match the aesthetics of, for example, the battery assembly to which the cartridge is attached. Also, such cartridges can be indiscrete, making it obvious what solution the user may be using. Further, such cartridges may be incompatible with a user's desired mouthpiece.

SUMMARY

There is a need in the art for a personal vaporizer that can accommodate a cartridge without upsetting desired aesthetics. There is a further need in the art for a personal vaporizer that can accommodate a cartridge yet maintain a desired mouthpiece. There is a still further need in the art for a personal vaporizer that can accommodate a cartridge in a manner so that the cartridge is not visible.

In accordance with one embodiment, the present specification provides a personal vaporizer, comprising a battery assembly, a cartridge and a cartridge cover. The battery assembly has a mount boss with a first connector and a second connector. The cartridge has a cartridge connector selectively engaged with the battery first connector, the cartridge having a vapor channel opening at a vapor outlet. The cartridge cover has a cover connector selectively engaged with the battery second connector and enclosing the cartridge so that the vapor outlet is disposed within the cartridge cover. A preferential air flow path is defined through the cartridge and through the vapor outlet. Resistance to air flow along the preferential air path is less than resistance to air flow between the cartridge cover and the cartridge.

In some such embodiments, a seal is arranged between the cartridge cover and the cartridge.

In additional embodiments, the cartridge comprises a fluid chamber and an atomizer.

In some such embodiments, the atomizer and fluid chamber are integrally formed. In additional embodiments, the fluid chamber is selectively detachable from the atomizer.

In further embodiments, the cartridge cover and the battery assembly both have the same outer diameter. In some such embodiments, the cartridge has an outer diameter less than the outer diameter of the battery assembly. In additional embodiments, an inner diameter of the cartridge cover adjacent the cartridge is less than 1% greater than the outer diameter of the cartridge.

In yet further embodiments, the vapor outlet opens into a lumen defined within the cartridge cover, and additionally comprising a mouthpiece attached to the cartridge cover and communicating with the lumen. In still further embodiments, the mouthpiece is selectively detachable from the cartridge cover.

In accordance with another embodiment, the present specification provides a cover configured to fit over a cartridge attached to a battery pack, the cartridge having an atomizer with air intake holes, the atomizer attachable to the battery pack at a distal end and being coupled with a fluid chamber having a mouthpiece seat and a vapor outlet, the vapor outlet being proximal the mouthpiece seat, the atomizer configured to selectively vaporize fluid within the fluid chamber, the vaporized fluid exiting the fluid chamber via the vapor outlet. The cover comprises an elongated body defining an internal lumen. The elongated body is sized to fit concentrically over the disposable cartridge so as to completely encase the disposable cartridge within the cover internal lumen. A distal end of the cover is internally threaded so as to engage external threads on a mount boss of the battery pack. One or more holes are formed through the cover elongated body proximal the distal end of the cover, and are configured to communicate with air intake holes of the atomizer. A proximal end of the cover has a mouthpiece receiver configured to receive a mouthpiece. A sealing structure is configured to create an airtight seal between the one or more holes formed through the cover elongated body and the vapor outlet of the disposable cartridge when the cover is engaged with the battery. When the cover is engaged with a cartridge the cover internal lumen comprises an intake chamber defined distal of the sealing member and an outlet chamber defined proximal the sealing member.

In accordance with a further embodiment, the present specification provides a cover configured to fit over a cartridge attached to a battery assembly, the battery assembly having a mount boss having a first connector and a second connector, the cartridge having an atomizer coupled with a fluid chamber, the atomizer attached to the battery assembly first connector. The cover comprises an elongated body defining an internal lumen, the elongated body sized to fit concentrically over the cartridge so as to completely encase the cartridge within the cover internal lumen. A distal end of the cover is selectively attached to the battery assembly second connector. A sealing structure is configured to create an airtight or semi-airtight seal between an internal surface of the cover and an external surface of the cartridge when the cover is engaged with the battery second connector. When the cover is engaged with a cartridge, the cover internal lumen comprises an intake chamber defined distal of the sealing member and an outlet chamber defined proximal the sealing member.

In accordance with still another embodiment, the present specification provides a battery assembly for a personal vaporizer, comprising an elongated casing defining an enclosed battery chamber, a mount boss proximal to the battery chamber, and a selectively closable storage chamber disposed distal of the battery chamber. A rechargeable battery and a control circuit are enclosed within the battery chamber. The mount boss comprises a battery contact communicating electrically with the battery. An insert container is sized to fit within the storage chamber and to be selectively removed from the storage chamber. The storage chamber is defined between an elongate portion of a battery casing wall and a cap member that is selectively attachable to the battery casing wall.

BRIEF DESCRIPTION OF THE DRAWINGS

FIG. 5 is a side view of a cartridge cover configured in accordance with one embodiment;

FIG. 6 is a top view of the cartridge cover of FIG. 5;

FIG. 8A is a side view of an embodiment of a cartridge cover being attached to the assembly of FIG. 4;

FIG. 8B shows the assembly of FIG. 8A with the cartridge cover depicted in cross-section and the cartridge depicted as a silhouette;

FIG. 9A shows the assembly of FIG. 8A with the cartridge cover fully attached to the assembly of FIG. 4;

FIG. 9B shows the assembly of FIG. 9A with the cartridge cover depicted in cross-section and the cartridge depicted as a silhouette;

DESCRIPTION

Figure 2:
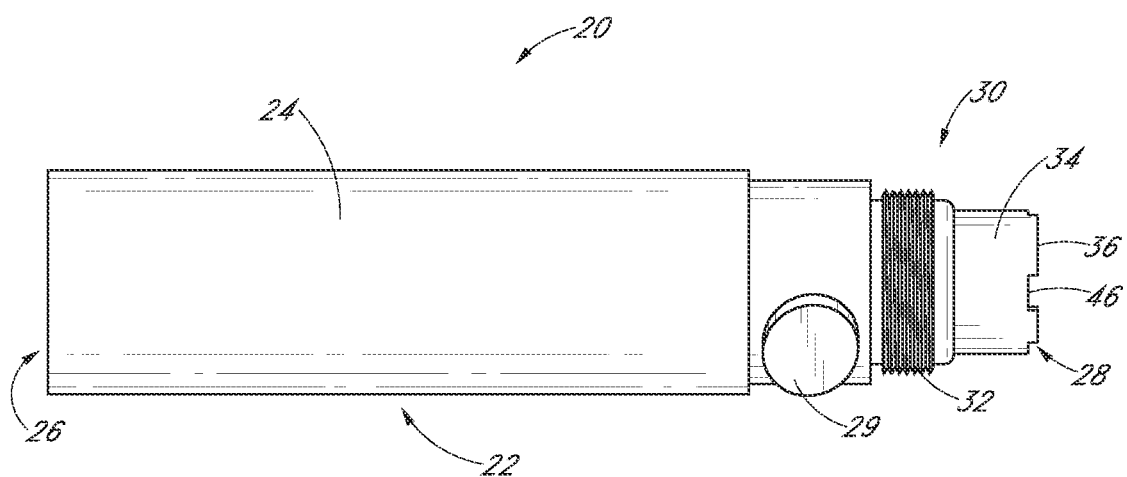
FIG. 2 is a side view of the battery assembly of FIG. 1.
Figure 1:
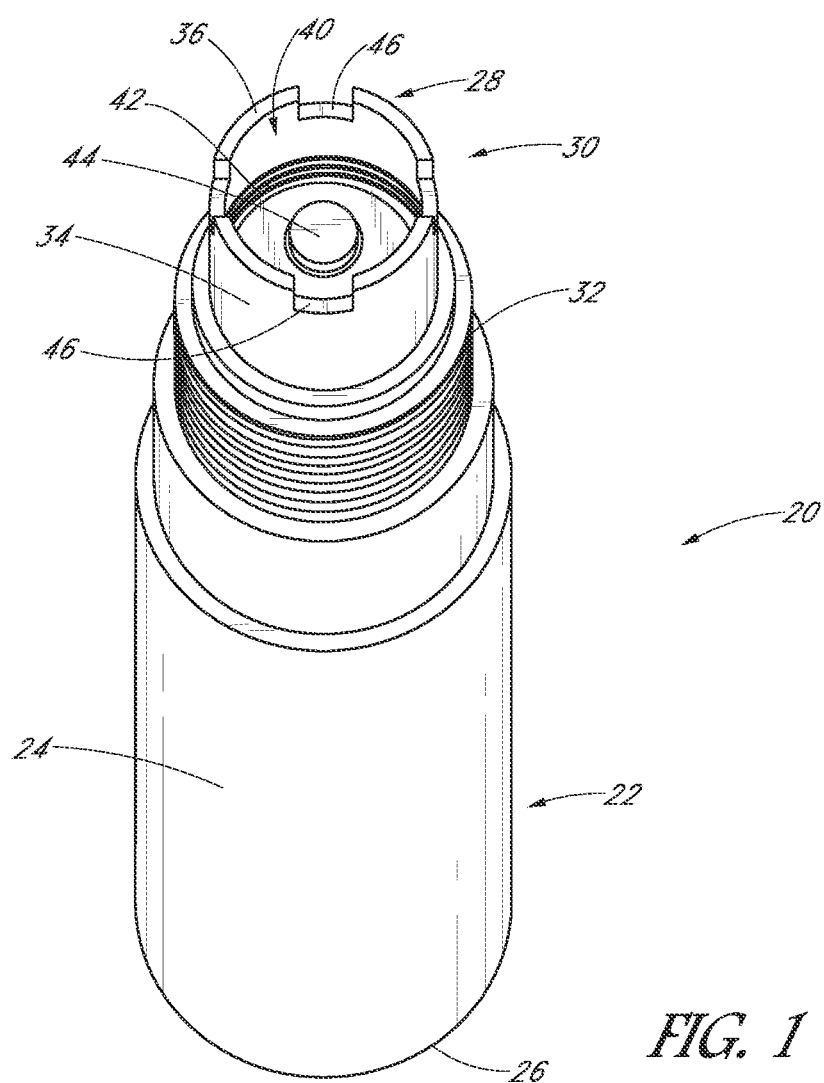
FIG. 1 is a perspective view of a battery assembly for use in some embodiments.

With initial reference to FIGS. 1 and 2, an embodiment of a battery assembly 20, or battery pack, for a personal vaporizer is illustrated. Certain features of the illustrated battery assembly 20 are typical of battery assemblies currently available on the market. For example, the battery assembly 20 may include a rechargeable battery, such as a lithium-ion battery, enclosed within a battery casing 22. The battery casing 22 may include an elongated body 24 that extends from a base or distal end 26 to a top or proximal end 28. An electronic controller may also be included within the casing 22 to control voltage, current, timing and the like. A button 29 may be provided for selectively actuating electricity delivery from the battery 20 to the atomizer. In some embodiments, the button 29 can include a light that indicates when power is being delivered.

With continued reference to FIGS. 1 and 2, at and adjacent the proximal end 28 of the battery assembly 20, the battery casing 22 defines a mount boss 30. The mount boss 30 includes connecting structures for connecting vaporizing structures, such as atomizers and fluid chambers, to the battery. The elongated body 24 is disposed distally of the mount boss 30. In some embodiments, the body 24 may include a decorative coating or sleeve that is configured to enhance the look of the vaporizer. For example, the body 24 may come in many different colors and/or have one or more unique and aesthetically pleasing surface treatments. Some embodiments may include a decorative sleeve that is selectively removable.

In the illustrated embodiment, the battery assembly mount boss 30 comprises an externally threaded portion 32 adjacent the decorative body 24. Preferably, the externally threaded portion 32 has a diameter somewhat smaller than a diameter of the decorative body 24. An extension 34 extends in a proximal direction from the externally threaded portion 32, preferably terminating in a top or proximal surface 36. As best shown in FIG. 2, the extension 34 preferably is tubular, defining a mount cavity 40 therewithin and having internal threads 42. Preferably, a diameter of the tubular extension 34 is less than the diameter of the externally threaded portion 32. A battery contact 44 is disposed within the tubular extension 34 at the base of the mount cavity 40. As shown, preferably a plurality of air intake slots 46 are formed in the extension at and adjacent the top surface.

As noted above, one or more vaporizing structures are attachable to the battery mount boss 30. Such vaporizing structures typically include an atomizer and a fluid chamber, which can be provided as separate pieces or combined as a single structure. The vaporizing structures can be of various styles, sizes, and configurations. For example, in some embodiments, the atomizer and fluid chamber are provided as one prefabricated cartridge. In some embodiments, such cartridges are disposable. In some embodiments, the fluid chamber is refillable so that the cartridges are reusable. In other embodiments, the atomizer and fluid chamber are separately formed and selectively attachable and detachable from one another.

Vaporizing structures can also be attached to the battery assembly 20 in various ways. In some embodiments, an atomizer can threadingly engage the external threads that the two of the battery mount boss 30. In other embodiments, an atomizer may threadingly engage the internal threads of the mount cavity extension before. However, preferably, a pin or other elongated contact extends into the mount cavity 40 to engage the battery contact 44 so as to communicate power from the battery 20 to the atomizer. Additionally, additional embodiments can employ non-threaded connection structures such as detents, friction fits, J-locks, and the like.

Figure 3:
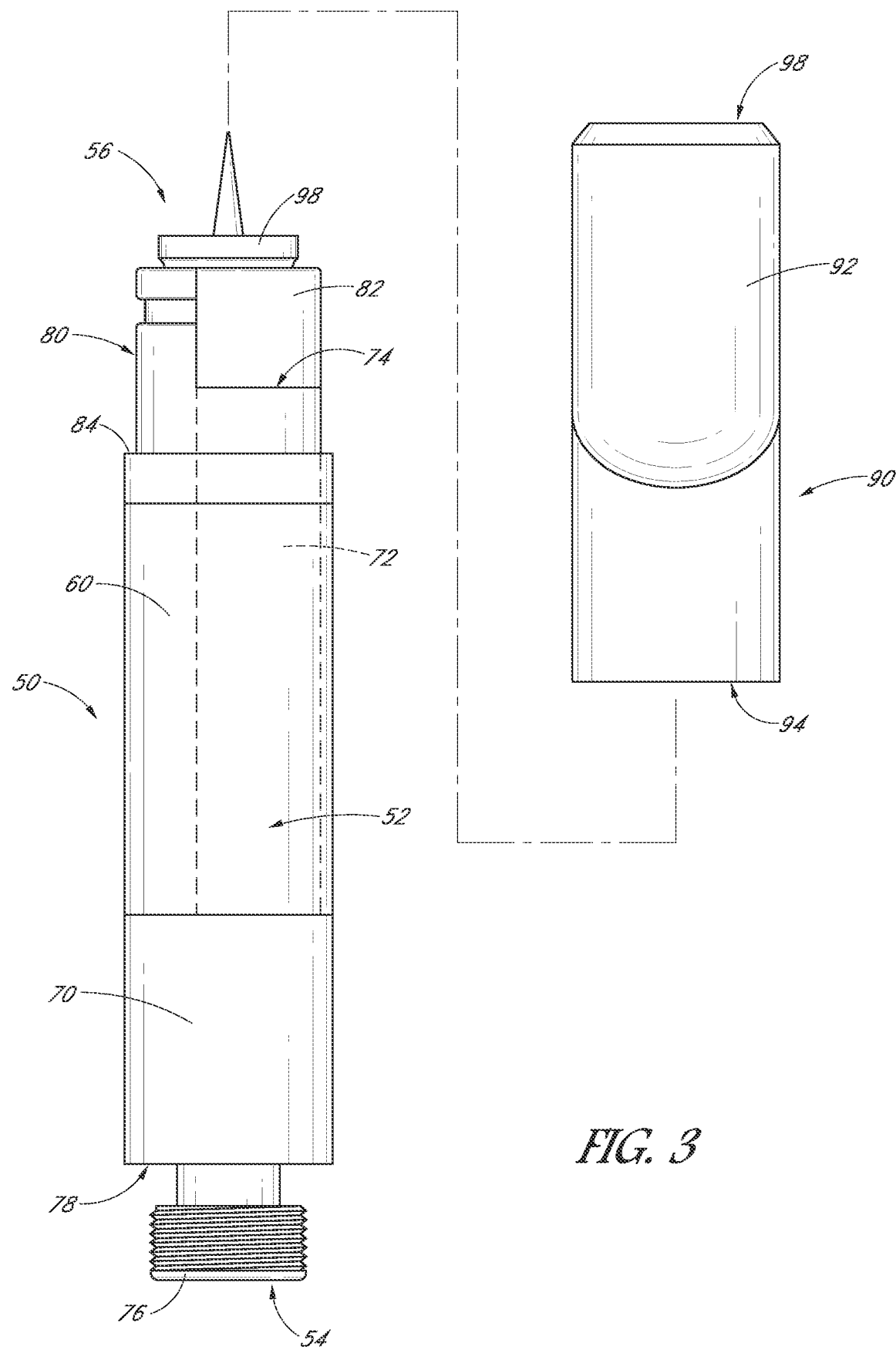
FIG. 3 is a side view of a cartridge in accordance with one embodiment.

With reference next to FIG. 3, one embodiment of a cartridge 50 is illustrated. Such a cartridge 50 can be obtained from PenVape, and is sold under the trademark Indica. The illustrated cartridge 50 comprises an elongated cartridge body 52 that extends from a distal or battery end 54 to a top or proximal end 56. The body 52 includes a fluid chamber 60 configured to hold a vaporizing medium such as a liquid solution comprising essential oils. The illustrated chamber 60 is made of a polymer material that is preferably at least partially transparent so that a user can see the level of essential oils remaining within the fluid chamber 60. An atomizer 70 is provided at and adjacent the distal end for, which atomizer 70 is operatively connected to the fluid chamber 60. In the illustrated embodiment, the atomizer 70 comprises a coil (not shown) constructed of a durable, electrically-conductive material, such as titanium or another metal, which material generates heat when subjected to an electric current. A vaporization chamber is defined between the fluid chamber 60 and the atomizer coil. In some embodiments, a wick communicates liquid from the fluid chamber 60 to the vaporization chamber. Preferably, an elongated vapor passage 72 is formed adjacent the fluid chamber 60 and extends from the vaporization chamber to a vapor outlet 74 that is formed proximal of the fluid chamber 60.

With continued reference to FIG. 3, the illustrated atomizer 70 includes a battery connector pin 76 extending distally from a terminal surface 78 of the atomizer 70. The illustrated battery connector pin 76 is externally threaded. Air intake holes (not shown) are formed through the terminal surface 78. During use, air is drawn through the air intake holes and through the atomizer 70 into the vaporization chamber, where it is mixed with atomized fluid to form a vapor. The vapor exits the vaporization chamber through the vapor channel 72 and is exhausted through the vapor outlet 74.

The proximal end 56 of the cartridge 50 includes a mouthpiece engagement portion 80 that has a reduced diameter relative to a diameter of the elongated body 52 in the chamber 60 and/or atomizer 70 portions. In the illustrated embodiment, the vapor outlet 74 opens within this mouthpiece engagement portion 80. In the illustrated embodiment, a recessed portion 82 of the outer wall in the mouthpiece engagement portion 80 is provided, and the vapor outlet 74 is formed adjacent the recessed portion 82. As such, the vapor outlet 74 is directly aligned with the flow path of vapor moving through the vapor channel 72.

Continuing with reference to FIG. 3, a mouthpiece seat 84 is defined on the cartridge 50. At the mouthpiece seat 84, the diameter of the cartridge 50 abruptly changes from that of the chamber 60 to that of the mouthpiece engagement portion 80. A mouthpiece 90 can be placed atop the cartridge 50. The mouthpiece 90 preferably includes an elongated tubular body 92 defining a lumen, and extends from a base 94 to an outlet end 96. In the illustrated embodiment, the base 94 of the mouthpiece 90 fits over the mouthpiece engagement portion 80 of the cartridge 50, and the base 94 of the mouthpiece 90 engages and rests upon the mouthpiece seat 84 of the cartridge 50.

In the illustrated embodiment, a removable fill cap 98 is disposed at the proximal/mouthpiece end 56 of the cartridge 50. The removable fill cap 90 can be removed so as to provide access to the fluid chamber 50 so that liquid or flavorings can be selectively added to the chamber.

Figure 4:
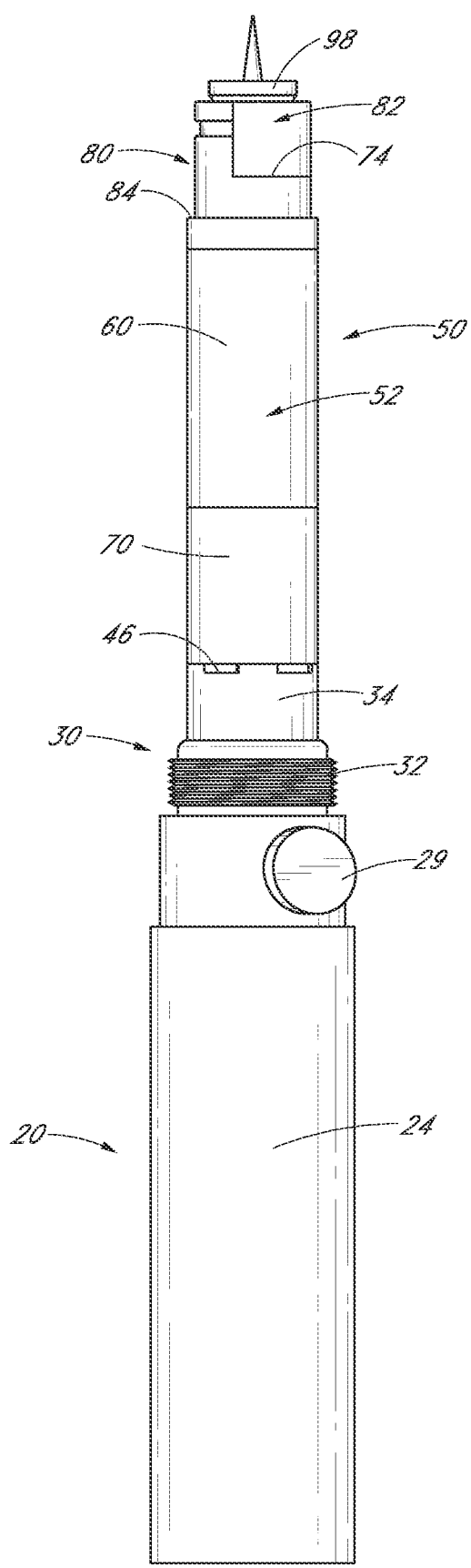
FIG. 4 is a side view of the cartridge of FIG. 3 attached to the battery assembly of FIG. 1.

With additional reference to FIG. 4, the cartridge 50 can be mounted to a typical battery assembly 20. In the illustrated embodiment, the externally-threaded battery connector pin 76 is advanced into the battery mount cavity 40 and threaded with the internal threads 42 of the battery mount boss extension 34. The cartridge 50 is threadingly advanced so that the battery connector pin 76 engages the battery connector 44 of the battery assembly 20, and the terminal surface 78 of the atomizer 70 engages and sits upon the top surface 36 of the battery mount boss 30. The air intake slots 46 of the mount boss 30 enable the cartridge's air intake holes to communicate with the surrounding atmosphere.

In use, the user inserts the mouthpiece 90 into his mouth, presses the battery button 29, and draws a breath. Pressing the button 29 triggers the atomizer 70 to heat liquid provided to the vaporization chamber from the fluid chamber 60, thereby vaporizing the liquid in the vaporizing chamber. By drawing a breath through the mouthpiece 90, the user pulls air through the air intake slots 46 of the battery mount boss extension 34 into the mount cavity 40 and through the air intake holes of the cartridge atomizer 70. The air further flows into the vaporization chamber and is mixed with the vaporized liquid, forming a vapor. The vapor then flows through the vapor channel 72 and through the vapor outlet 74 into the mouthpiece 90, which directs it into the user's mouth and lungs.

Although the embodiment as depicted in FIG. 4 functions adequately, some users find it aesthetically displeasing and indiscrete. For example, it is common for battery casings 22 to have decorative exterior surface treatments. However, in the illustrated configuration, when fully connected and operable, the undecorated cartridge 50 may visually clash with the stylish battery casing 22. This can cause displeasure for some users.

With additional reference to FIGS. 5-7A, one embodiment of a cartridge cover 100 is shown. The illustrated cover 100 is configured to slidably fit over the cartridge 50 and attach to the battery mount boss 30 so as to hide the cartridge 50 from view. Also, the cover 100 can be no configured with a decorative outer surface or fitted with a decorative sleeve so that, when assembled, the personal vaporizer is aesthetically pleasing. Also, the cover 100 hides the cartridge 50 from direct view, and is therefore more discrete.

Figures 7A, 7B:
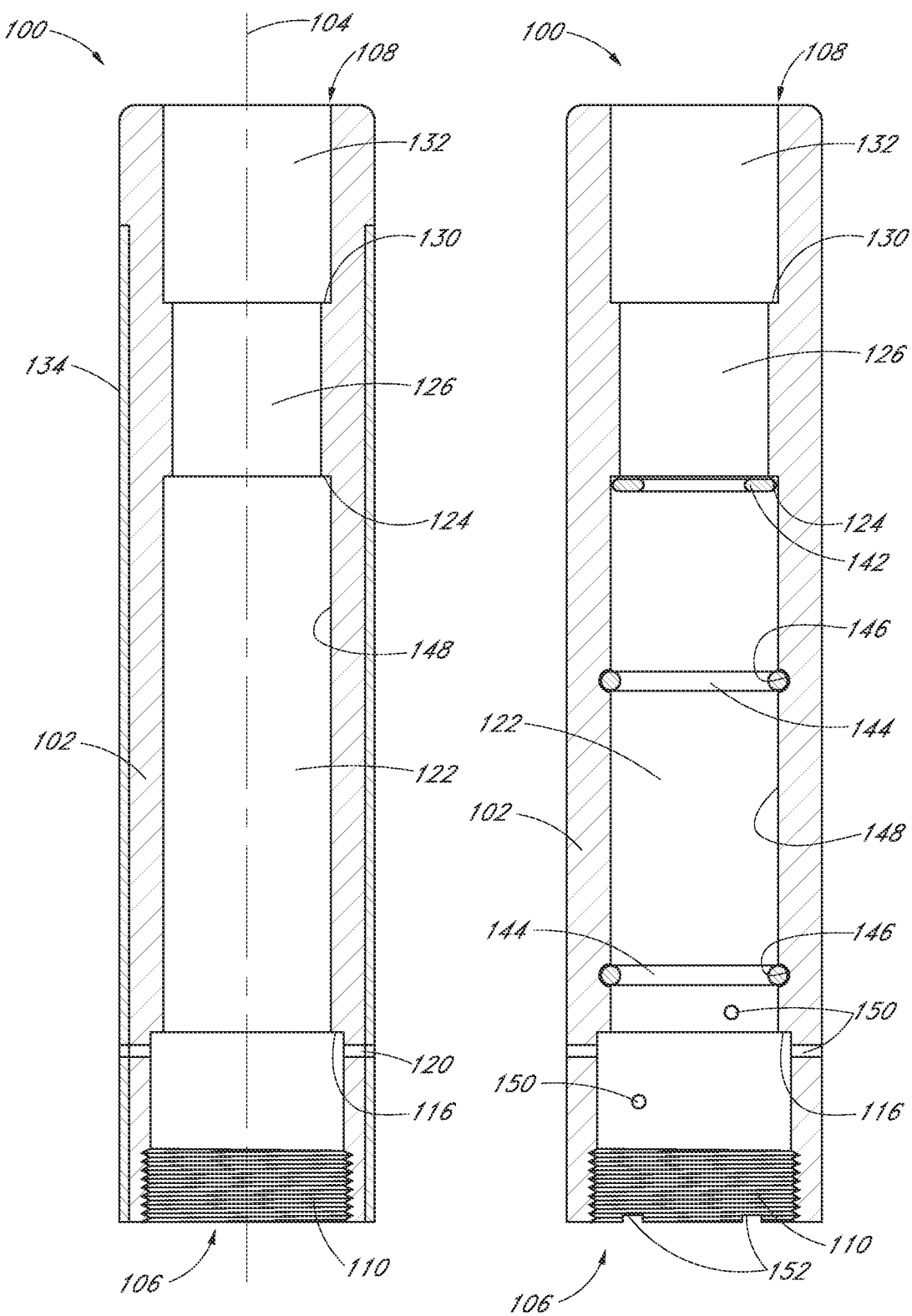
FIG. 7A is a cross-sectional view taken along lines 7A-7A of FIG. 6.
FIG. 7B is a cross-sectional view of another embodiment of a cartridge cover.

The illustrated cover 100 comprises an elongated tubular body 102 that is elongate along an axis 104 and has a distal or connection end 106 and a proximal or mouthpiece end 108. As shown in FIG. 7A, internal threads 110 are disposed adjacent the distal end 106 of the cover 100. With additional reference to FIGS. 8-9, the cover 100 can be slipped over the cartridge 50 so that the internal threads 110 of the cover 100 threadingly engage the outer threads 32 of the battery mount boss 30. Thus, the cover 100 can be attached to the battery 20, enclosing the cartridge 50, and providing an aesthetically pleasing and discrete personal vaporizing device.

With reference again to FIGS. 5-7A, in the illustrated embodiment, the tubular lumen 112 of the cover is divided into a plurality of lumen portions, each potentially having a different diameter. For example, a connector lumen portion 114 is disposed adjacent the distal end 106. As noted above, internal threads 110 are provided as part of the connector lumen 114. The connector lumen 114 extends from the distal end 106 of the cover 100 to a distal offset surface 116 that extends inwardly transversely to an axis 104 of the tubular cover 100. Preferably, a plurality of side holes 120 are formed through a wall of the cover 100 in the connector lumen portion 114.

An elongated body lumen 122 portion extends from the distal offset surface 116 to a sealing seat surface 124, which is defined by an offset surface extending transversely toward the cover axis 104. In a preferred embodiment, a diameter of the body lumen portion 122 is less than the connector lumen portion diameter, and approximates a diameter of the cartridge body 52. More precisely, preferably the diameter of the body lumen portion 122 is selected such that the body lumen 122 can be slid over the cartridge elongated body but preferably there is very little, if any, space between the cartridge and embodiment surface. Preferably the body lumen diameter is about 5% greater than the cartridge diameter. More preferably the body lumen diameter is less than about 3% greater than the cartridge diameter. Still more preferably the body lumen diameter is less than about 1% greater than the cartridge diameter.

Continuing with specific reference to FIG. 7A, the sealing seat 124 extends transversely toward the axis 104. A neck lumen portion 126 extends proximally from the sealing seat 124 to a cover mouthpiece seat 130, which cover mouthpiece seat 130 extends transversely away from the cover axis 104. A mouthpiece receiver lumen portion 132 extends from the cover mouthpiece seat 130 to the proximal end 108 of the cover 100. As shown in this embodiment, the body lumen portion 122 has a diameter less than that of the connector lumen portion 114, and the neck lumen portion 126 has a diameter less than that of both the body lumen portion 122 and the mouthpiece receiver lumen portion 132. Preferably, the mouthpiece receiver lumen portion 132 has a diameter approximating an outer diameter of a standard-sized mouthpiece, which mouthpiece preferably includes a tubular body. In the illustrated embodiment, the mouthpiece receiver lumen diameter is greater than the neck lumen diameter but less than the body lumen diameter. In additional embodiments, the mouthpiece receiver lumen diameter can be about the same as the body lumen diameter or, in further embodiments, greater than the body lumen diameter. The mouthpiece 90 discussed above in connection with FIG. 4 preferably can be inserted into the mouthpiece receiver lumen 132 and advanced until the base 94 of the mouthpiece engages the cover mouthpiece seat 130. Other mouthpiece embodiments (see, for example, FIG. 9) can also be configured to fit in the mouthpiece receiver lumen 132. In other embodiments, a mouthpiece can be incorporated into the cover rather than being formed separately. Such embodiments thus may not include a mouthpiece receiver lumen, but may include a mouthpiece lumen that may, in some embodiments, be contiguous with the neck portion lumen.

In the embodiment illustrated in FIG. 7A, a decorative sleeve 134 is provided over the body 102. As such, an outer diameter of the body 102 is reduced in order to accommodate the decorative sleeve. In the illustrated embodiment, the decorative sleeve 134 does not extend along the entire length of the body 102. In other embodiments, however, the decorative sleeve can extend along the entire length of the body. Preferably, the decorative sleeve 134 matches or complements the decorative pattern of the battery assembly 20, which also may include a decorative sleeve. Notably, the cover 100 embodiment depicted in FIGS. 8 and 9 does not employ a decorative sleeve, but the inner structure of these embodiments is substantially similar to that depicted in FIG. 7A.

With particular reference next to FIGS. 4 and 8-9, in use, the cartridge 50 is first assembled onto the battery 20 as depicted in FIG. 4. The cover 100 is then slipped over the cartridge 50 so that the internal threads 110 of the cover 100 engage the external 32 threads of the battery mount boss 30, as depicted in FIG. 8A. FIG. 8B shows FIG. 8A, but with the cover 100 shown in cross-section and the cartridge 50 shown as a silhouette. The cover 100 is rotated so as to threadingly engage the cover 100 and battery mount boss 30, and simultaneously advance the cover over the cartridge until the cover is fully advanced onto the battery mount boss as shown in FIGS. 9A and 9B.

Preferably, the dimensions of the cover 100 are selected so that when the cover 100 is fully advanced onto the battery mount boss 30, the cover sealing seat surface 124 engages the cartridge mouthpiece seat 84. Most preferably, the cover sealing seat 124 engages the cartridge mouthpiece seat 84 with sufficient force to create an airtight or semi-airtight seal. Similarly, as depicted in FIG. 9B, preferably the distal offset surface 116 is aligned at or near the interface between the cartridge 50 and the battery mount boss 30. As such, an intake chamber 140 is formed within the connector lumen 114 around the air intake slots 46. The cover side holes 120 are positioned to open into the intake chamber 140. Thus, an air intake path is defined from the environment through the cover side holes 120 into the intake chamber 140, then through the battery air intake slots 46 and further through intake holes of the cartridge 50.

With continued reference to FIGS. 8 and 9, the cartridge vapor outlet 74 is disposed within the neck lumen portion 126 of the cover 100 on a side of the sealing seat 124 generally opposite the intake chamber 140. As such, in embodiments in which the cover sealing seat 124 and cartridge mouthpiece seat 84 engage with an airtight seal, when a user draws a breath through the mouthpiece 138, air will not flow between the cover lumen surface and the cartridge outer surface. Instead, air will be drawn from outside the device, through the cover side holes 120 into the intake chamber 140, through the intake slots 46 and into the air intakes of the cartridge 50, through the cartridge 50 and vaporization chamber and out of the vapor outlet 74 into the cover neck lumen 126 and further into the mouthpiece 138 and into the user's mouth and lungs. In embodiments in which the engagement of the sealing seat 124 with the mouthpiece seat 84 is only semi-airtight, there will be more resistance to airflow between the cartridge outer surface and the cover than through the cartridge 50 via the vaporization chamber. Thus, air will preferentially flow through the cartridge 50 via the vaporization chamber, and as a user draws a breath, little if any intake air will flow between the cover and the cartridge outer surface.

As noted above, preferably the diameter of the body lumen 122 is selected to approximate the outer diameter of the cartridge body 52. Such a relatively tight fit provides further resistance to airflow between the body lumen surface and the cartridge outer body. Thus, this tight fit helps reduce any air pressure being at the airtight or semi-airtight seal, and acts as a seal pressure reduction structure.

With particular reference to FIG. 9B, a separately-formed mouthpiece 138 can be placed in the mouthpiece receiver lumen 132 of the cover 100. Preferably, a base of the mouthpiece 138 engages the cover mouthpiece seat 130 so that the cartridge vapor outlet 74 is aligned with the mouthpiece lumen. It is to be understood that various styles of mouthpieces can be employed. In the illustrated embodiment, the mouthpiece 138 is held in place by a friction fit. Other embodiments may employ various structures, such as a detent, J-lock, or the like. In still further embodiments, the mouthpiece receiver lumen and the mouthpiece may be threaded. As discussed above, in yet further embodiments, the mouthpiece may be integrally formed as part of the cover.

In some embodiments the cover 100 has an outer diameter that is the same as the outer diameter of the battery assembly 20. In the embodiment illustrated in FIG. 9, the cover has an outer diameter that is the same as the outer diameter of most of the battery assembly, but the battery assembly has a portion with a slightly smaller outer diameter. It is to be understood that the cover can be shaped to correspond with the slightly smaller outer diameter, or in any other manner as desired.

In some embodiments, the battery, associated cover and, optionally, a mouthpiece can be sold as a kit, with at least the battery and cover sharing a common decorative aesthetic theme. One or more cartridges can be included in the kit and/or can be sold separately.

With reference next to FIG. 7B, a schematic depiction of another cover 100 embodiment in cross-section shows potential additional or alternative features, one or more of which can be used in additional embodiments. For example, the cover 100 embodiment illustrated in FIG. 7A employs relatively precise machining to obtain an airtight seal without using an elastomeric member such as an O-ring or another sealing structure. FIG. 7B, however, depicts some embodiments of options for different sealing structures. For example, in one embodiment, an elastomer such as an O-ring 142 can be provided adjacent the cover sealing seat 124 so that when the cover 100 is engaged about the cartridge 50, the O-ring 142 engages the cartridge mouthpiece seat 84 so as to create an airtight seal between the cartridge 50 and the cover 100. In another embodiment, rather than an O-ring, the cover sealing seat (and/or cartridge mouthpiece seat) can be coated with an elastomeric and/or seal-inducing material.

FIG. 7B also shows optional placements of additional O-rings 144 that can be employed in other embodiments. In some embodiments, the body lumen 122 may or may not be sized to fit relatively tightly about the cartridge body 52, and one or more O-ring seats 146 can be formed in the inner surface 148 of the cover body 122. One or more O-rings 144 can sit in such seats 146 and are configured to engage the outer surface of the cartridge 50 when the cover 100 is installed over the cartridge 50 so as to create an airtight seal.

With continued reference to FIG. 7B, in additional embodiments, the cover side holes 150 need not all be aligned at the same position along the length of the elongated cover 100. Also, in some embodiments air intake slots 152 can be formed in the distal end 106 of the cover 100 to facilitate air intake. It is envisioned that still further methods and structures for providing an appropriate seal, mount and air intake can be employed.

The embodiments discussed above have employed a cartridge 50 in which the fluid chamber 60 and atomizer 70 are combined in a single unit and are detachable from the rest of the personal vaporizer. It is to be understood that the principles discussed herein can be employed using cartridges having different configurations. For example, in another embodiment, a fluid chamber and atomizer can be separately formed and selectively attachable to one another, but each may have a small enough diameter so that the cover fits over the pair when assembled. In additional embodiments, only the fluid chamber has a small enough diameter for the cover to fit over it, and the atomizer has an outer diameter about the same as the battery assembly and cover. In such an embodiment, the atomizer may have a connector for attaching to the cover, as well as a connector for attaching to the fluid chamber, and the fluid chamber would be enclosed within the cover. Broadly speaking, a cartridge as discussed herein can comprise a part of a vaporizer (such as a fluid chamber, vapor exit channel, or atomizer, taken alone or combined with one another as a unit) that can be enclosed within an embodiment of a cover. In still further embodiments, the cartridge can comprise additional structures. For example, rather than a vaporizing medium chamber being a fluid chamber, the cartridge can comprise a chamber configured for holding a wax vaporizing medium, as well as having a vapor outlet channel. In such an embodiment, the atomizer may include a bowl for holding such wax for vaporizing. The cover, then, can fit over the vaporizing medium chamber and attach to the atomizer, or may fit over both the atomizer and the chamber.

Figure 10A:
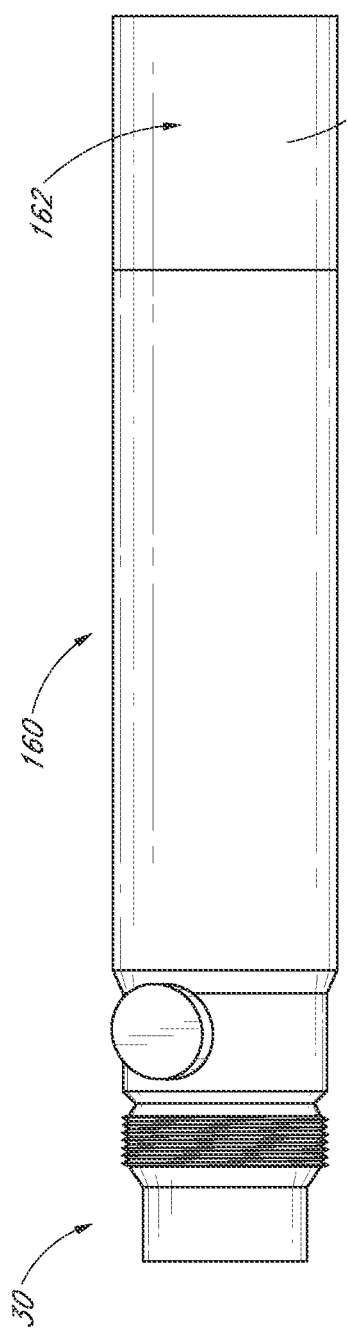
FIG. 10A is a side view of another embodiment of a battery assembly.
Figure 10B:
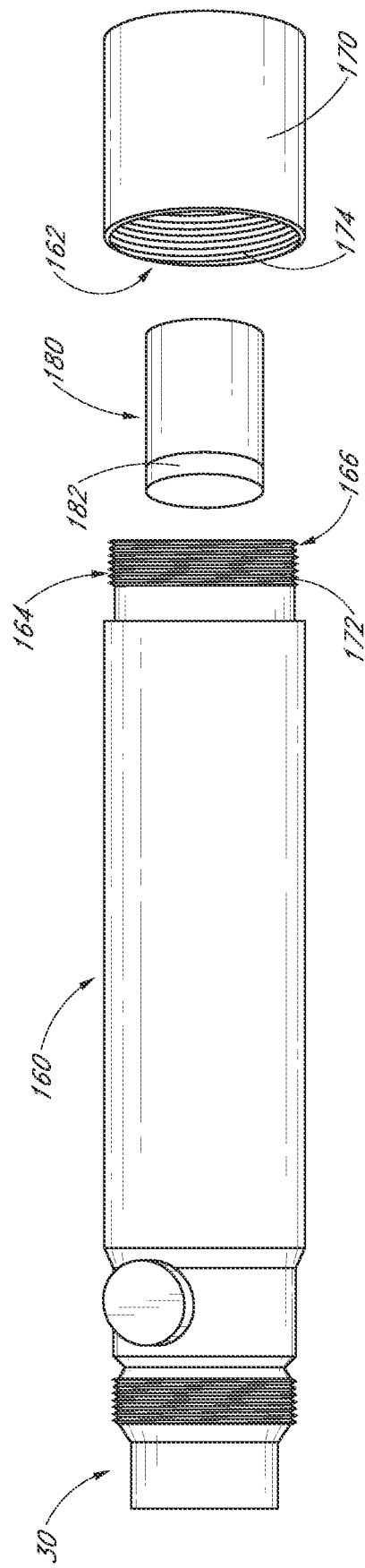
FIG. 10B is an exploded side view of the battery assembly of FIG. 10A.

With reference next to FIGS. 10A-10B, additional embodiments of battery casings 160 can include a storage compartment 162. The storage compartment 162 preferably is incorporated into the base 164 of the battery casing 160, and comprises a base connector 166 having an elongated side wall, and a cap 170 selectively connectable to the base connector 166. In the illustrated embodiment, the base connector 166 includes external threads 172, and the cap 170 has internal threads 174 that can engage the base connector threads 172 to close the storage compartment 162. A storage cavity is defined between the elongated side wall, an upper wall in the battery casing 160, and a base wall in the cap 170.

In a preferred embodiment, a container 180 or liner is sized and configured to fit within the storage cavity 162. Preferably, the container 180 includes a cap 182 so that the container 180 can be sealingly closed. For example, the side walls of the storage cavity 162 can be smooth, and the external diameter of the container 180 can be sized to fit complementarily within the storage cavity without substantial play between the container and the side walls. As such, rattling of the container within the storage cavity during use of the device can be limited or eliminated. In another embodiment, one or more elastomers and/or foam members are attached to one or more, or all, of the side wall, base wall and upper wall. As such, even if the container is substantially different in size than the storage cavity, the members will help hold the container securely within the storage cavity, thereby minimizing or eliminating rattle.

In a preferred embodiment the container is transparent and configured to carry a fluid, such as a replacement fluid that can be loaded into the cartridge fluid chamber. In other embodiments the container can include a concentrated flavor liquid that the user may use to enhance the flavor of the vapor. In still another embodiment, the container may be a multi-chamber container that includes multiple ingredients that may be selectively added to the fluid in the chamber. For example, the container can have two, three or more chambers, with each chamber including concentrated flavor liquid that can be added to the vaporizing solution. In yet additional embodiments, the storage compartment may not include a removable container, but may directly enclose material, such as fluids for use with the device. In such embodiments, a sealing member such as an o-ring can be arranged on one of the cap and base connector so that fluid is prevented from leaking from the storage compartment.

The embodiments discussed above have disclosed structures with substantial specificity. This has provided a good context for disclosing and discussing inventive subject matter. However, it is to be understood that other embodiments may employ different specific structural shapes and interactions. For example, the vaporizer embodiments discussed herein are generally cylindrical. It is to be understood that other embodiments may employ principles discussed herein in connection with vaporizers having different shapes.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above, but should be determined only by a fair reading of the claims that follow.

What is claimed is:

1. A method, comprising:
attaching a cartridge to a battery assembly, comprising: connecting a cartridge connector to a first connector of the battery assembly, the cartridge having an atomizer coupled with a fluid chamber, and a cartridge outer wall that encloses the fluid chamber and an elongated vapor passage that extends from the atomizer to a proximal opening, the cartridge having at least one intake hole communicating with the atomizer;
advancing a cover having a cover lumen over the cartridge so that at least the fluid chamber and the atomizer are enclosed in the cover lumen, the cover having a cover proximal opening; and
securing the cover so the cover does not move relative to the cartridge;
wherein a cartridge flow path is defined from the intake hole through the atomizer, the vapor passage and the cover proximal opening, and a second flow path is defined within the cover lumen and is located between the cartridge outer wall and an inner surface of the cover, the second flow path extending from a distal point to the cover proximal opening; and
wherein the second flow path is more resistant to air flow therethrough than the cartridge flow path so that air flows preferentially through the cartridge flow path.

2. The method as in claim 1, wherein the cover has at least one side hole, and the distal point is at or adjacent the at least one side hole so that the second flow path extends from the at least one side hole to the proximal opening.

3. The method as in claim 1, wherein an inner diameter of the cover is less than 3% greater than an outer diameter of the cartridge outer wall.

4. The method as in claim 1, comprising removing a mouthpiece from a proximal end of the cartridge before advancing the cover over the cartridge.

5. The method as in claim 4, wherein the cover has a mouthpiece seat communicating with the cover proximal opening, and additionally comprising placing the mouthpiece into the mouthpiece seat so that the cartridge flow path and the secondary flow path both communicate with the mouthpiece.

6. The method as in claim 4, wherein the cover has a mouthpiece seat communicating with the cover proximal opening, and additionally comprising placing a second mouthpiece into the mouthpiece seat so that the cartridge flow path and the secondary flow path both communicate with the second mouthpiece.

7. The method as in claim 1, wherein an intake chamber is defined between the cartridge and the at least one side hole of the cover when the cover is secured relative to the cartridge, and wherein the at least one intake hole communicates with the intake chamber.

8. The method as in claim 7, comprising engaging a seal between the cartridge outer wall and an inner surface of the cover when advancing the cover over the cartridge, the seal inhibiting air flow between the cartridge outer wall and the inner surface of the cover.

9. The method as in claim 8, wherein the seal is disposed proximal of the at least one side hole of the cover.

10. The method as in claim 9, wherein securing the cover comprises engaging a distal connector of the cover with a second connector of the battery.

11. The method as in claim 1, wherein the cover lumen has a body portion having a first diameter and a neck portion having a second diameter less than the first diameter, the neck portion being proximal of the body portion, and wherein the second diameter is less than an outer diameter of the cartridge distal of a proximal opening of the vapor passage.

12. The method as in claim 11, wherein the cover lumen has a mouthpiece portion having a third diameter greater than the second diameter, the mouthpiece portion being proximal of the neck portion, and additionally comprising advancing a mouthpiece into the mouthpiece portion so that the proximal opening of the vapor passage communicates with a mouthpiece passage of the mouthpiece.

13. The method as in claim 12, wherein the fluid chamber has an elongated a proximal end wall, and the cover lumen comprises a transverse-extending sealing seat surface interposed between the body portion and the neck portion, and comprising advancing the cover over the cartridge comprises engaging the sealing seat surface with the proximal end wall of the fluid chamber.

14. The method of claim 13, comprising engaging the sealing seat surface of the cover with the proximal end wall of the fluid chamber with sufficient force to create an airtight or semi-airtight seal.

* * * * *